(No Model.)
S. LAWSON.
STEAM TRAP.
No. 248,101. Patented Oct. 11, 1881.
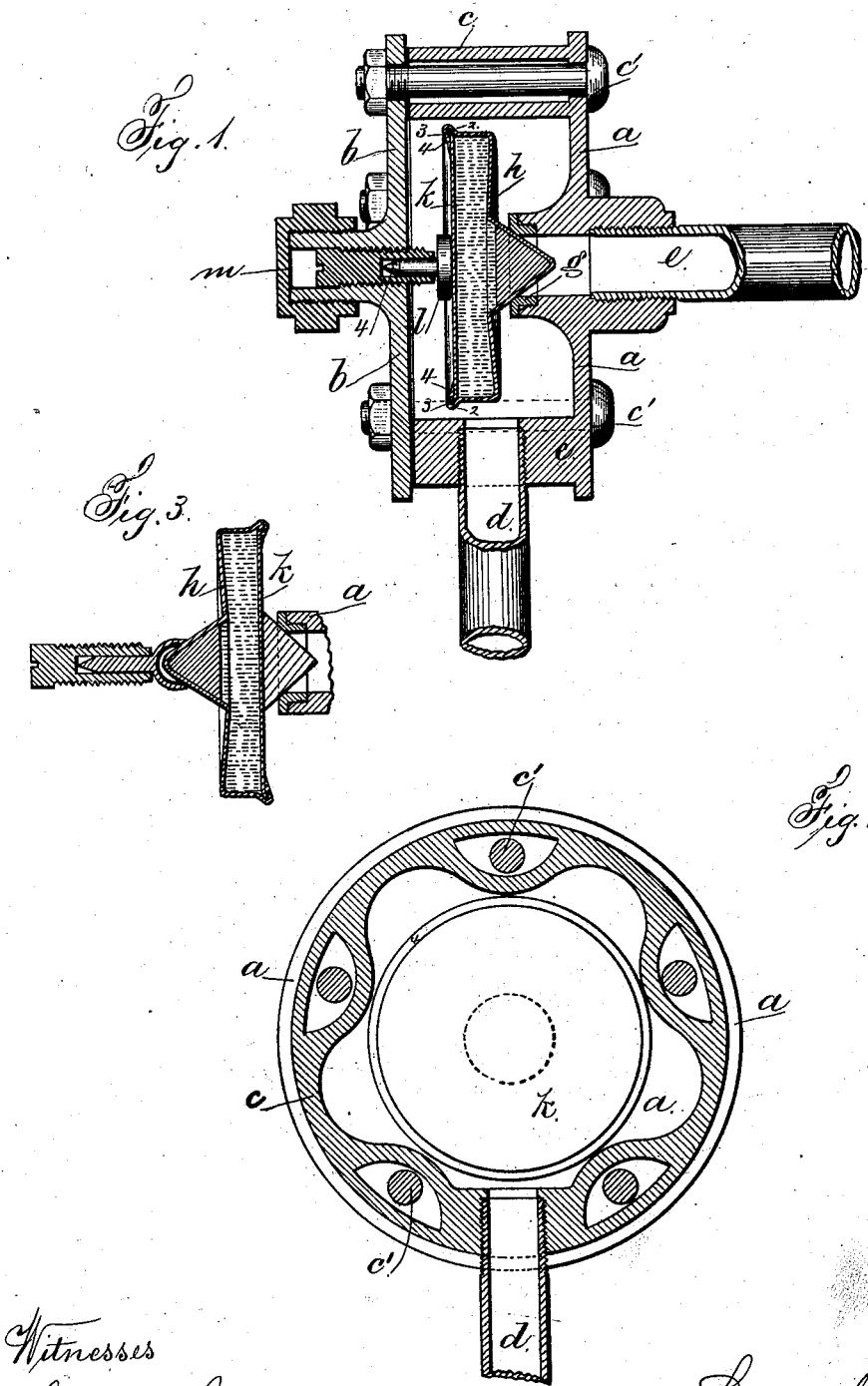

UNITED STATES PATENT OFFICE.

SAMUEL LAWSON, OF NEW YORK, N. Y., ASSIGNOR TO HIMSELF AND ALONZO T. WELCH, OF SAME PLACE.

STEAM-TRAP.

SPECIFICATION forming part of Letters Patent No. 248,101, dated October 11, 1881.

Application filed March 5, 1881. (No model.)

*To all whom it may concern:*

Be it known that I, SAMUEL LAWSON, of the city and State of New York, have invented an Improvement in Steam-Traps, of which the following is a specification.

Steam-traps have been made with a sheet-metal expansion-vessel containing a liquid that expands under the action of heat and enlarges the vessel sufficiently to cause it to act as a valve against the seat at the end of the inlet that admits water and steam into the trap. The air and water pass freely out of the steam-radiator pipes, while the expansion-vessel remains cool; but when the steam-heat acts on the expansion-vessel the inlet-orifice is closed and the steam retained in the radiators. In traps of this kind, where the issuing water and steam strike against a flat surface and are turned off at right angles to the inlet, a whistling noise is often produced, and particles of foreign matter are also liable to lodge and obstruct the valve.

In steam-traps of the before-named character an adjusting-screw has been used. In some cases the end of the screw has been rounded or pointed, and the expansion-vessel against which it acted was liable to be injured by the screw being set up too tightly; besides this, the round or pointed end of the screw did not afford a sufficient bearing-surface to keep the expansion-vessel in its correct position relative to the seat. Hence it could not be depended upon to close the inlet-pipe when the steam reached it, because the surface of the expansion vessel was not parallel to the seat. In other traps the adjusting-screw has had a broad flat end that rests against the expansion-vessel. This kept the said vessel parallel to the seat; but the screw was liable to be moved and the adjustment of the parts destroyed, because the expansion-vessel is frequently rotated by the issuing water or air, and, acting against the broad flat end of the screw, turned it also. Hence the expansion-vessel would fail to close the inlet to the trap and allow steam to escape, or else close it too soon and keep back water and air.

My invention is made to obviate these difficulties in the manner hereinafter set forth.

In the drawings, Figure 1 is a vertical section of the trap. Fig. 2 is a sectional plan of the case, and Fig. 3 shows a modification of parts whereby the expansion-vessel can be reversed.

The case is made of the head $a$ and body $c$ cast together, and the cap or head $b$, which is removable. The outside of the body $c$ is cylindrical, and the interior is corrugated to form supports for the expansion-vessel, and these corrugations are hollow for the passage of the bolts $c'$, by which the removable head is secured. The discharge water-pipe is at $d$ and the inlet steam and water pipe is at $e$. Instead of the end of this pipe $e$ being flat, as heretofore, I make a ring, $g$, of gun-metal or similar material upon the projecting inner face of the head $a$, with a conical or countersunk inner surface for the valve to rest against, so that the surface will not become rusty, and is more durable than the iron of the case, and if the ring becomes injured it may be driven out, and the surface of the case that has been covered by the ring will form a new seat, thus making the trap last much longer than heretofore.

The expansion-vessel is of sheet metal hermetically sealed. It contains wood-naphtha or other expansible liquid. I make this vessel of two parts, the valve-disk $h$ and edges of the case being of one piece of sheet metal, and the back disk, $k$, of another piece of sheet metal. The edges are doubled-seamed together and then soldered. There is an offset at 2 for the flanged edges 3 of the disk $k$ to rest upon, and the edge 4 is folded over the flanged edge 3. This insures great strength, and when soldered from the inside by solder placed in the vessel and melted by heat applied to the edge of the vessel the solder runs into the joint and makes the vessel perfectly tight. It may also be soldered on the outside, as shown in the drawings.

The expansion liquid may be introduced through a small hole that is afterward soldered up.

The valve of the expansion-vessel is conical and adapted to fit the ring-seat, and this valve may be made of the sheet metal stamped or spun up and filled with solder, as shown, or it may be a separate conical piece of metal upon the expansion-vessel. This conical valve allows the steam and water or air to pass by it freely without producing a vibrating or whistling noise.

Instead of the screw resting against the expansion-vessel, and thereby being exposed to the risk of being turned if the expansion-vessel is rotating, as aforesaid, I place between the screw and the expansion-vessel a swivel-button, $l$, the same having a broad head at one end that bears against the flat side of the expansion-vessel, and at the other end a bearing-point, 4, resting against the screw. This construction allows the expansion-vessel and swivel-button to turn freely without the possibility of turning the screw or changing the adjustment accidentally. The stem of this swivel-button may pass loosely into a hole in the screw, as shown in Fig. 1; or it may pass into a hole in the case, the screw acting against its end. The cap $m$ closes the trap tightly and prevents the adjusting-screw being acted upon through ignorance or design. Hence the trap, when set, is not liable to loose its adjustment.

The parts of the valve may be reversed, if worn, by substituting a recessed swivel-button for the flat one, as shown in Fig. 3. This brings the flat side of the expansion-vessel against the seat.

I claim as my invention—

1. The combination, in a steam-trap, of an expansion-vessel, a conical valve-seat, and a conical valve applied at one side of the expansion-vessel, and having the conical point of the valve within the conical seat, substantially as set forth.

2. The combination, in a steam-trap, of the expansion-vessel, an adjusting-screw, and a swivel-button between the adjusting-screw and the expansion-vessel, arranged for operation substantially as set forth.

3. The combination, in a steam-trap, of an expansion-vessel having a conical valve at one side thereof and containing an expansible liquid, an adjusting-screw, and a swivel-button between the adjusting-screw and the expansion-vessel, substantially as set forth.

4. In a steam-trap, the combination, with the expansion-vessel, of a case having a cylindrical exterior surface and a corrugated interior surface for sustaining the expansion-vessel, a removable head to the case, and bolts for the same passing through and being inclosed by the case, as set forth.

5. The expansion-vessel for a steam-trap, made of sheet metal, with a conical valve permanently connected thereto at one side, and the expansible liquid within the vessel, substantially as set forth.

Signed by me this 28th day of February, A. D. 1881.

SAMUEL LAWSON.

Witnesses:
GEO. T. PINCKNEY,
WILLIAM G. MOTT.